(12) United States Patent
Dingle (10) Patent No.: US 8,027,751 B2
(45) Date of Patent: Sep. 27, 2011

(54) FLUID DELIVERY SYSTEM

(75) Inventor: Philip J. G. Dingle, Rochester, MI (US)

(73) Assignee: Delphi Technologies Holding S.arl, Troy, MI (US)

( * ) Notice: Subject to any disclaimer, the term of this patent is extended or adjusted under 35 U.S.C. 154(b) by 1106 days.

(21) Appl. No.: 11/879,210

(22) Filed: Jul. 16, 2007

(65) Prior Publication Data

US 2009/0019835 A1 Jan. 22, 2009

(51) Int. Cl.
*G06F 19/00* (2011.01)
(52) U.S. Cl. ........................................ 700/282; 417/521
(58) Field of Classification Search .................. 700/286, 700/291, 282, 281; 60/282; 417/44.1, 12; 604/891.1
See application file for complete search history.

(56) References Cited

U.S. PATENT DOCUMENTS

| | | | |
|---|---|---|---|
| 3,878,377 A * | 4/1975 | Brunone | 705/413 |
| 5,904,666 A * | 5/1999 | DeDecker et al. | 604/65 |
| 6,126,642 A * | 10/2000 | Kriesel et al. | 604/207 |
| 6,208,913 B1 * | 3/2001 | Marshall et al. | 700/266 |
| 6,568,416 B2 * | 5/2003 | Tucker et al. | 137/14 |
| 6,931,305 B2 * | 8/2005 | Sherwood | 700/282 |
| 2004/0093856 A1 * | 5/2004 | Dingle et al. | 60/286 |
| 2010/0023170 A1 * | 1/2010 | Sherwood | 700/282 |

* cited by examiner

*Primary Examiner* — Kidest Bahta
(74) *Attorney, Agent, or Firm* — Thomas N. Twomey (57) ABSTRACT

A fluid delivery system for delivering a metered dose of fluid from a supply tank (28) to a downstream chamber or vessel (10), comprises a pump apparatus (20) comprising a pump plunger (32) which is operable to perform a pumping stroke under the control of an electromagnetic actuator (36), including a solenoid (36a), to effect delivery of the fluid and a control unit (24) for supplying an input signal (58) to the solenoid (36a) to initiate a current flow to the solenoid (36a) and thereby initiate movement of the pump plunger (32). An electronic device (54) provides an output signal to indicate that movement of the pump plunger has stopped at the end of the pumping stroke, and a timer determines a time difference between the input signal (58) being supplied to the solenoid (36a) and the output signal being output by the electronic device (54). A processor (26) compares the time difference with a predetermined time difference and determines, as a result of the comparison, whether or not the pump plunger (32) has performed a valid pumping stroke in which an intended volume of fluid is displaced.

21 Claims, 4 Drawing Sheets

FLUID DELIVERY SYSTEM

TECHNICAL FIELD

The present invention relates to a fluid delivery system for delivering a metered dose of fluid from a supply tank to a downstream vessel or chamber. In particular, but not exclusively, the invention relates to fluid delivery system including a pump apparatus for delivering a metered dose of reagent fluid, such as urea, to an exhaust gas pipe of an internal combustion engine or other equivalent device. The invention also relates to a method of determining the total volumetric delivery of a fluid to the downstream vessel or chamber and/or to a method of determining a remaining level of said fluid in the fluid supply tank.

BACKGROUND TO THE INVENTION

Internal combustion engines emit undesirable pollutants in their exhaust stream. One such pollutant is nitrogen oxides, comprising nitrogen monoxide and nitrogen dioxide (hereinafter referred to simply as "NOx"). NOx is generated from automobile engines such as diesel engines, and other combustion devices. Accordingly, exhaust system devices are coupled to the engine to limit and/or remove the pollutants from the exhaust system. Technologies have been and continue to be developed to attenuate these emissions.

NOx may be cleaned from exhaust gases of internal combustion engines through the use of catalysis. In addition to removing NOx, other catalysts may be employed to also remove unburned hydrocarbons (HC) and carbon monoxide (CO). When the engine is operated with a lean air/fuel ratio, the catalyst is efficient at removing the HCs and COs because of the extra oxygen in the exhaust gas. However, the extra oxygen tends to inhibit the removal of NOx.

In the case of exhaust gas from gasoline engines, NOx is usually removed by using so-called three-way catalysts. Also, in the case of large, stationary combustion apparatus, such as internal combustion engines for cogenerators, metal oxide catalysts such as $V_2O_5$ are used, and ammonia is introduced into the exhaust gas stream, whereby nitrogen oxides in the exhaust gas are catalytically and selectively reduced.

Conventional Selective Catalytic Reduction (SCR) of NOx involves injection of a typically aqueous urea solution or reductant into the exhaust system ahead of the SCR catalyst. Common reductants include aqueous urea in conjunction with selective catalytic reduction, and perhaps hydrocarbon diesel fuel, for the supplemental heat necessary to initiate particulate trap regeneration. As used herein the term "urea" is meant to encompass urea in all of its commercial forms, including those containing: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine and tricyanourea.

The reductant dosing system is required to accurately meter the reductant into the exhaust system, while being robust in service and responsive to the engine or after treatment control system. Accordingly, most prior art dosing systems have been designed for delivery of reductant in a two fluid system, namely the reductant and a supply of pressurized air. Such systems make use of a simple low pressure metering pump for delivering the reductant into a mixing chamber where it co-mingles with pressurized air from an onboard source. This mixture is conducted through a pipe to the remote dosing location in the exhaust where it exits through a simple atomizing nozzle into the exhaust stream. A typical air atomizing pressure for this type of system might be 2 bar. By way of example, EP 1 149 991 describes a two fluid system of the aforementioned type.

Since urea is not essential to the functioning of the engine, it is possible to operate the engine even when the supply of urea is low or has been depleted altogether. However, such a condition is unacceptable, not least because the engine then no longer complies with statutory regulations for emissions levels. It is therefore known to provide the urea tank with a urea level sensor (not shown) so that imminent exhaustion of the supply can be forewarned. U.S. Pat. No. 6,063,350, for example, describes a reagent dosing system in which such a level sensor is used for this purpose.

Aqueous urea is a common reagent in such systems, but the characteristics of the fluid are problematic in certain respects. For example, aqueous urea can form hard salt crystals which clog mechanisms and disrupt regular operation. For this reason, fluid level sensors of the mechanical type, which employ a float on a pivoting arm connected to a variable resistance coil, are unsuited for use in a urea supply tank. Typically, therefore, a more expensive urea level sensor is employed that is immune from clogging.

It is one object of the invention to provide a system for use in delivering reagent in an SCR exhaust gas cleaning system of an internal combustion engine in which the requirement for a separate reagent level sensor is removed altogether.

SUMMARY OF THE INVENTION

According to a first aspect of the present invention, there is provided a fluid delivery system comprising a pump apparatus for delivering a metered dose of fluid from a supply tank to a downstream vessel. The pump apparatus comprises a pump plunger which is operable to perform a pumping stroke under the control of an electromagnetic actuator, including a solenoid, to effect delivery of the fluid, and a control unit for supplying an input signal to the solenoid to initiate a current flow to the solenoid and thereby initiate movement of the pump plunger. The fluid delivery system further includes an electronic device which provides an output signal when movement of the pump plunger stops at the end of its pumping stroke, and a timer is provided for determining a time difference between the input signal being supplied to the solenoid and the output signal being output by the electronic device. A processor compares the time difference signal with a predetermined time difference and determines, as a result of the comparison, whether or not the pump has performed a valid pumping stroke in which an intended volume of fluid is displaced.

In another aspect, the invention relates to a method for determining an actual total number of valid pumping strokes performed by the pump apparatus of the fluid delivery system. The pump apparatus includes a pump plunger for performing a pumping stroke of fixed displacement/stroke.

By calculating the actual total number of valid pumping strokes, it is possible to determine with accuracy the total volumetric delivery of fluid to the downstream vessel. If the level of fluid within the supply tank is known at start of pumping (i.e. an initial condition), it is therefore possible to determine with accuracy the remaining level of fluid within the supply tank.

The invention is particularly suitable as a reagent dosing system of an internal combustion engine. The system may be used in a two fluid system of the type described previously, in which reagent is delivered to an engine exhaust chamber (the downstream vessel) by the pump apparatus where it is mixed with pressurised air. In such systems the pressure of reagent delivered by the pump apparatus tends to be relatively low. In single fluid systems no source of pressurised air is provided, in which case the pump apparatus may be arranged to deliver a higher pressure of reagent fluid to the exhaust chamber. By way of example, the invention may be implemented in a reagent dosing system of the type described in US Patent Publication No. 2004-0093856-A1.

The invention may also be used on board a remotely piloted or robotized vehicle of the type powered by an internal combustion engine, for example.

In one embodiment of the system, the pump apparatus includes an armature coupled to the pump plunger which is attracted to the solenoid when a current is supplied thereto, thereby causing the pump plunger to move.

In one embodiment of the system, the processor forms a part of the control unit but, alternatively, it may be a separate component.

The processor may include a counter for counting the number of valid pumping strokes so as to determine a total volumetric quantity of fluid delivered to the downstream vessel since an initial condition.

Conveniently, the processor is operable to determine a value for a remaining level of fluid within the supply tank based on (i) the total volumetric quantity of fluid delivered to the downstream vessel since the initial condition and (ii) a fluid level in the supply tank at the initial condition.

It is convenient for the initial condition to be the point at which the supply tank is at full level. For example, if the supply tank is a replaceable canister having a known full level, the canister may be replaceable each time the processor determines that the supply tank has depleted below a predetermined amount. Replacement of the canister defines the initial condition.

In one embodiment the electronic device is a glitch detect circuit for determining when movement of the pump plunger has stopped at the end of its pumping stroke.

By way of example, the glitch detect circuit determines when movement of the pump plunger has stopped at the end of the pumping stroke by monitoring a change in current decay through the solenoid.

In another aspect of the invention, there is provided a method for determining the total number of valid pumping strokes performed by a pump apparatus of a fluid delivery system for delivering a metered dose of fluid from a supply tank to a downstream chamber or vessel. The method may comprise driving a pump plunger of the pump apparatus to perform a pumping stroke under the control of an electromagnetic actuator, including a solenoid, to effect delivery of the fluid, supplying an input signal to the solenoid to initiate a current flow to the solenoid and thereby to initiate movement of the pump plunger, and counting the number of input signals so as to determine a total number of pumping strokes that are initiated. A halt to movement of the pump plunger at the end of the pumping stroke is detected and an output signal is generated to indicate said halting of pump plunger movement. A time difference signal is determined between the input signal being supplied to the solenoid and the output signal being generated, and the time difference signal is compared with a predetermined time difference representative of a valid pumping stroke. As a result of the comparison, it is determined whether or not the pump plunger has performed a valid pumping stroke and, if it is determined that the pump plunger has not performed a valid pumping stroke, the pumping stroke is discounted from the total number of pumping strokes so as to determine an actual number of valid pumping strokes which have contributed to depletion of fluid within the supply tank.

Pumping strokes that are initiated, but which do not contribute a full delivery of fluid to the total dose to the downstream chamber, do not contribute to depletion of the supply tank. By discounting invalid pumping strokes from the total stroke count, an accurate determination can be made of when the supply tank has depleted, or is within a predetermined tolerance of being depleted.

The method may further comprise determining a value for the volume of fluid delivered by a single, valid pumping stroke, and using the actual number of valid pumping strokes and the value for the volume of fluid delivered by a single, valid pumping stroke to determine the remaining level of fluid within the supply tank.

The method may still further comprise determining a value for the volume of fluid delivered by a single, valid pumping stroke, and using the actual number of valid pumping strokes and the value for the volume of fluid delivered by a single, valid pumping stroke to determine the total volume of fluid delivered since an initial condition.

Conveniently, the initial condition is equivalent to the supply tank being at a predetermined known full level.

The step of determining the value for the volume of fluid delivered by a single, valid pumping stroke, includes interrogating a control unit of the fluid delivery system to look-up a pre-stored value of said volume.

The step of providing an output signal when movement of the pump plunger has stopped at the end of its pumping stroke includes using a glitch detect circuit.

For example, a halt to movement of the pump plunger at the end of the pumping stroke may be determined by monitoring a change in slope of current flow through the solenoid or by detecting a glitch or discontinuity in said current flow.

The method may include providing an alert signal if it is determined that the remaining level of fluid within the supply tank drops below a predetermined level.

The invention relates, in another aspect, to a reagent dosing system for an internal combustion engine including a fluid delivery system as set out in the first aspect of the invention for delivering a metered dose of fluid from a reagent supply tank to an exhaust passage of the engine.

BRIEF DESCRIPTION OF THE DRAWINGS

The invention will now be described, by way of example only, with reference to the following Figures in which.

DETAILED DESCRIPTION OF THE DRAWINGS

Figure 1:
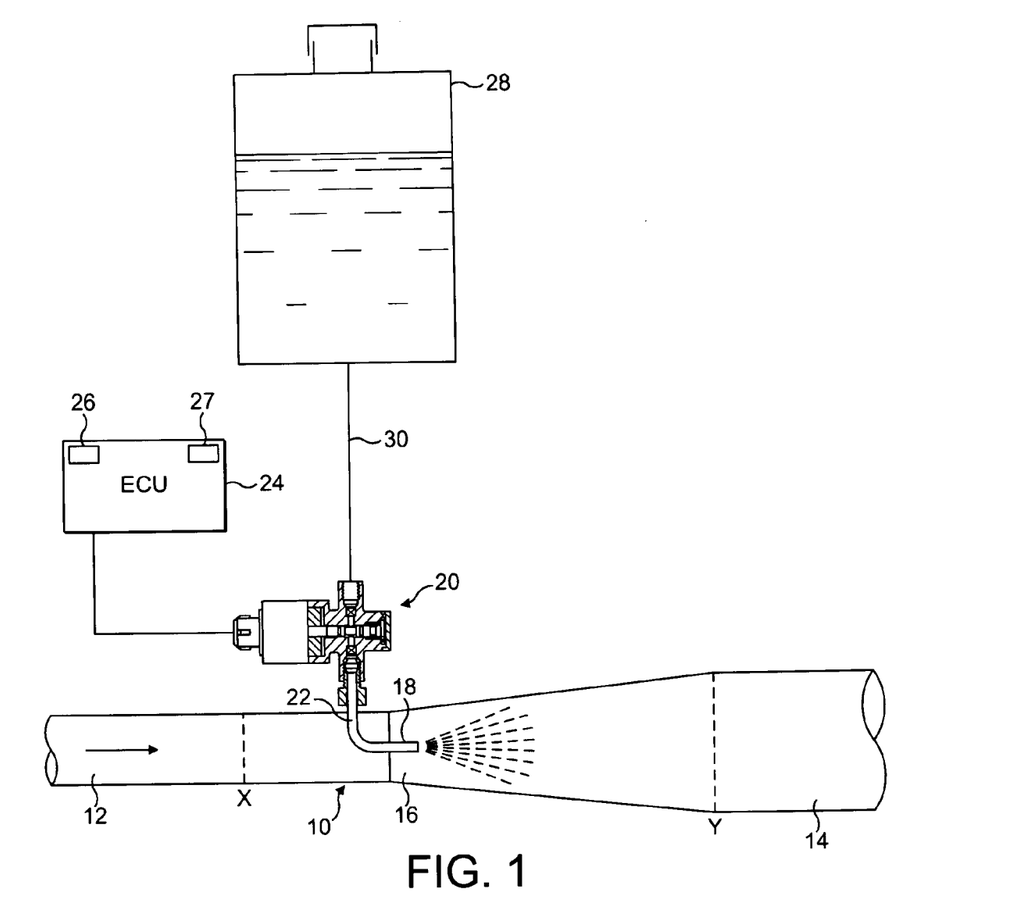
FIG. 1 is a schematic illustration of an exhaust system including a reagent delivery system in accordance with a first embodiment of the present invention.

Referring to FIG. 1, an exhaust system for an internal combustion engine includes an exhaust pipe 10 having an inlet end 12 in communication with an exhaust of an engine (not shown) and an outlet end 14 in communication with atmosphere. The exhaust pipe is provided with a diesel particulate filter, located approximately at position X, and a selective catalytic reduction (SCR) catalyst located approximately at position Y. A mixing section 16, intermediate the particulate filter and the SCR catalyst, accommodates a nozzle of an injection device 18 for delivering a reagent into the mixing section 16 of the exhaust pipe 10.

The injection device 18 is positioned so as to deliver an atomised spray of reagent to the exhaust flow as it flows between the filter and the catalyst. A pump apparatus in the form of a metering pump 20 delivers a known quantity of reagent to the injection device 18 through a supply pipe 22 in a known time under the control of an engine control unit (ECU) 24. The ECU 24 includes a microprocessor 26 loaded with an algorithm to control operation of the metering pump 20 in dependence on various operating parameters. The metering pump 20 communicates with the supply tank 28 of reagent fluid via an inlet supply pipe 30. Typically, the reagent is aqueous urea. In other systems (not shown) the diesel particulate filter is downstream of the SCR catalyst, in which case the metering pump 20 delivers reagent to a mixing section upstream of the diesel particulate filter.

Figure 2:
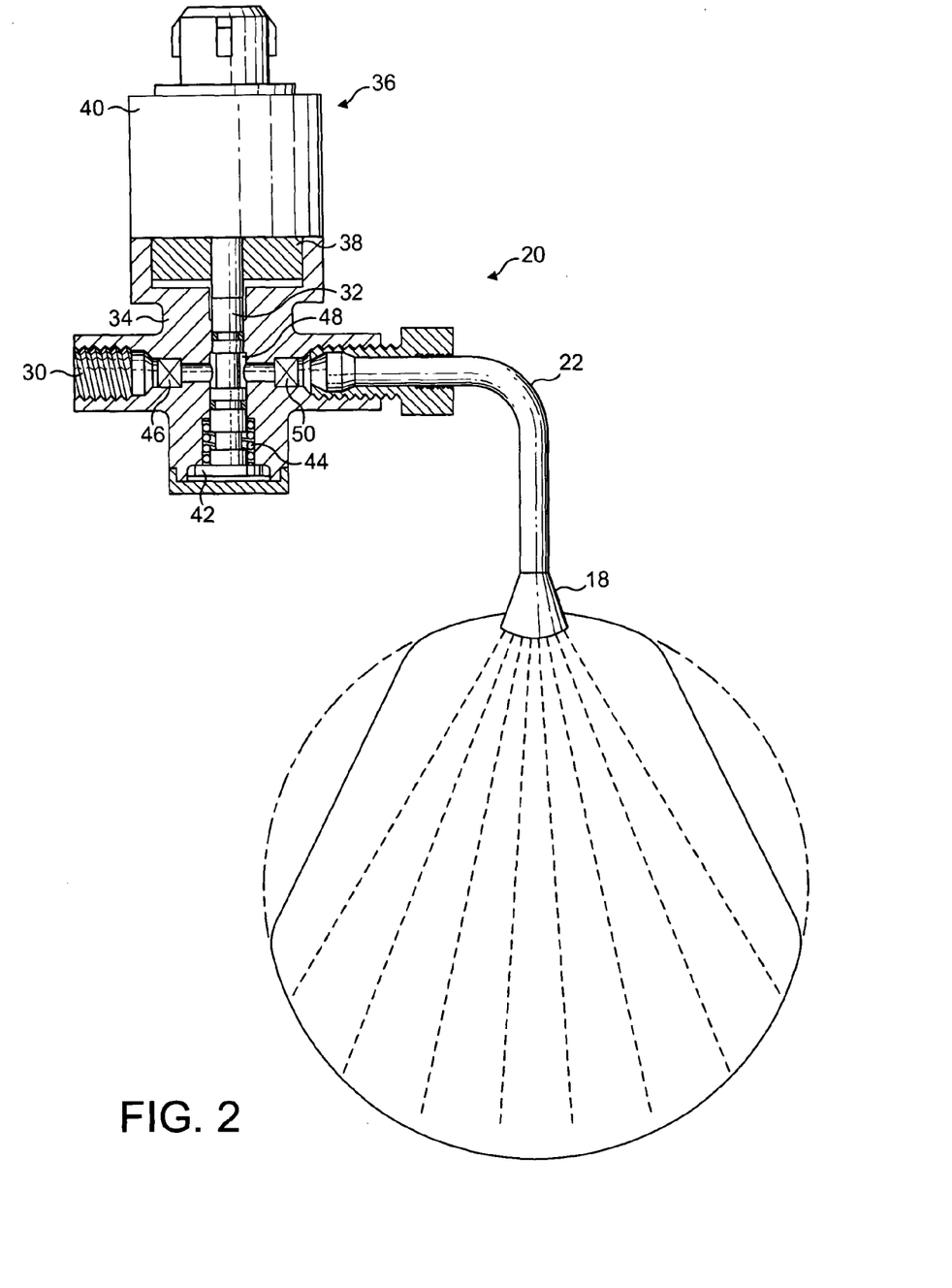
FIG. 2 is a cross sectional view of a metering pump for use in the reagent delivery system of FIG. 1.

The metering pump 20 is shown in more detail in FIG. 2, and includes a pump plunger 32 which is slidable within a stepped bore of a pump housing 34 under the control of a solenoid-controlled actuator, referred to generally as 36. The actuator 36 includes a solenoid and stator (not visible), to which a current is supplied to generate a magnetic field, and an armature 38 coupled to the pump plunger 32 at its upper end. The solenoid and stator are housed within a solenoid housing 40 which abuts the pump housing 34 at its upper end. The frame and structure surrounding the solenoid, the upper end of the pump plunger 32 and a stationary magnetic pole (not shown) provide a flux path to focus the magnetic field. The armature 38 reacts to the magnetic field and is attracted to the stationary pole, thereby causing the pump plunger 32 to move within the pump housing 34.

The pump plunger 32 includes a flange 42 at its lower end, the upper surface of the flange defining an abutment surface for a biasing component in the form of a spring 44. The spring 44 serves to urge the pump plunger 32 in a downward direction into a position in which the lower surface of the flange 42 abuts the end of the bore in the pump housing 34 when the solenoid of the actuator 36 is de-energised. When energized, the armature 38, the pump plunger 32 and the flange 42 move upwards until the upper surface of the flange 42 abuts a step in the bore of the pump housing 34, thereby arresting its motion. By controlling the current supplied to the solenoid, movement of the pump plunger 32, back and forth within the bore, can therefore be controlled. Because the pump plunger 32 operates between two hard stops described, it is therefore a fixed stroke device providing a fixed and predetermined displacement.

The metering pump 20 draws aqueous urea from the supply tank 28 through the inlet supply pipe 30 which delivers the urea through an inlet check valve 46 to a pump chamber 48 defined within the stepped bore of the pump housing 34. As the pump plunger 32 is moved up and down by the actuator 36, the pressure of fluid within the pump chamber 48 is increased and is dispersed under pressure into the outlet supply pipe 22, via an outlet valve 50 and, hence, to the injection device 18.

By way of example, the solenoid may be an E-core type of solenoid having a short stroke and providing high force with a correspondingly high injection pressure. As an alternative to using a solenoid-actuated pump plunger 32, a piezoelectrically-actuated pump plunger may be used.

In normal use, the metering pump 20 is operated so as to deliver a known volume of urea to the injection device 18, and therefore the exhaust stream, in a known time and in such a manner that appropriate proportionality is maintained between engine NOx production and the reagent delivered. This may be achieved by varying the actuation cyclic frequency or repetition rate of the pump plunger 32 accordingly. Thus, by counting and totalizing the number of strokes of the pump plunger 32 it is possible to determine the total flow through the pump 20 in unit time. Furthermore, if the volumetric capacity of the supply tank 28 is known, and the displacement volume of the metering pump 20 is known, it is possible to determine the number of strokes of the pump plunger 32 that will exhaust the supply tank 28.

For example, if the volumetric capacity of the supply tank 28 is 100 liters and the displacement volume of the pump 20 is 4.5 cubic millimeters, the number of strokes of the pump plunger 32 required to exhaust the supply tank 28 is given by:

$$100 \times (1000 \times 1000) = 100{,}000{,}000 \text{ cubic millimeters}/4.5$$

$$= 22{,}222{,}222 \text{ strokes}$$

The remaining volumetric content of the supply tank 28 may also be deduced by referencing the totalized number of pump plunger strokes at any point in time to the number above. For example, if the stroke count is 18,500,000, the remaining volumetric content of the supply tank 28 will be:

$$22{,}222{,}222 - 18{,}500{,}000 = 3{,}722{,}222 \times 100 / 22{,}222{,}222$$

$$= 16.75\%.$$

Since the remaining volumetric content of the supply tank 28 can be calculated using the aforementioned technique, it therefore becomes possible to eliminate the expensive reagent level sensor that is commonly provided to monitor the remaining level of reagent within the tank.

The inventor has, however, now identified a problem with the aforementioned method, namely that not all strokes of the pump plunger 32 necessarily give rise to displacement of the full theoretical volumetric discharge. Such an effect leads to inaccuracies in the total volumetric displacement through the pump 20.

One example of where such a situation may occur is if the reagent fluid within the supply tank 28 changes phase to a gas due to elevated temperature. Another example is where the temperature of reagent fluid within the supply tank 28 drops to below about −11° Celsius, the temperature at which the reagent fluid freezes. Should freezing occur, it is possible that the ECU 24 may demand a discharge of urea at a time when the system is inoperable. In such circumstances, activation of the metering pump 20 can be used to accelerate the defrosting process as described in co-pending European patent application No. 06253638.8 (Delphi Technologies, Inc.), or intermittent pumping may be commanded throughout the intermediate phase between frozen and normal operation. In this event, simply counting the number of pump plunger strokes will give a misleading representation of the total volumetric displacement of the pump 20 during this period.

Not only does frozen reagent fluid within the supply tank 28 give rise to an error in the total volumetric displacement of the pump 20, but it can also lead to a mismatch between the demanded urea dose based on NOx production. The present invention recognises these problems and provides a modification to the aforementioned pumping stroke counting method so as provide an alert that such an error or mismatch has occurred.

The invention utilises a means for counting the number of strokes for which the pump plunger 32 completes a full valid stroke, by, for example, using a glitch detection method. Glitch detection techniques are known in fuel injection systems, for example as described in granted U.S. Pat. Nos. 5,668,476, 5,959,825 and 5,803,049. Another glitch detection technique is described in U.S. Pat. No. 4,140,084.

Figure 3:
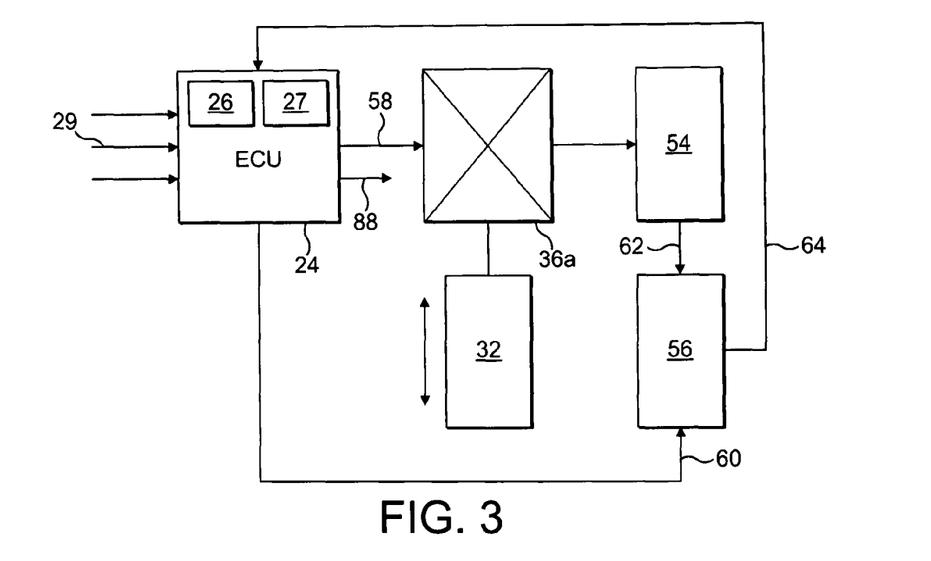
FIG. 3 is a schematic diagram of a fluid delivery system of one embodiment of the present invention, including a metering pump as in FIG. 2 together with a glitch detect circuit and an engine control unit, for determining a number of valid plunger strokes of the metering pump.

Referring to FIG. 3, the apparatus for counting the number of full strokes for the pump includes a glitch sensor circuit 54 and a timer circuit or device 56. The ECU 24 includes a processor 26 and a current drive circuit 27 and receives a number of signals 29 from the engine. The signals 29 may include a NOx sensor output signal and an ammonia sensor output signal. In response to the signals 29, the ECU 24 determines a demanded urea dose based on a model, look-up tables or data maps stored in the ECU 24. Once the demanded urea dose is determined, the processor 26 of the ECU 24 calculates the number of pumping strokes and/or an actuation frequency required for the pump 20 to deliver the demanded dose and outputs a first energisation signal to the current drive circuit 27 which delivers a current 58 to the solenoid 36a of the actuator. Each time an energisation signal is output to the current drive circuit 27 to cause a drive current 58 to be supplied to the solenoid 36a, the ECU 24 provides a simultaneous signal 60 to the timer device 56 which records the time at which the signal 60 was received.

When the drive current 58 is output to the solenoid 36a, the resulting current flow through the solenoid 36a causes a magnetic field to attract the armature 38, thereby causing the pump plunger 32 to move upwardly within the pump housing 34 against the force of the spring 44. This is referred to as the plunger pumping stroke. At the end of the upward stroke the current is removed and the plunger 32 performs the downward stroke under the action of the spring 44. This is referred to as the plunger return stroke. The pumping stroke of the plunger is of fixed stroke length due to the flange 42 engaging the blind end of the bore in the pump housing 34 at the start of the stroke, and engaging with the step in the bore in the pump housing 34 at the other end of the stroke.

Just before the pump plunger 32 reaches the end of its pumping stroke, with the upper surface of the flange 42 just spaced from the step in the pump housing bore, the drive current is removed and current flow through the solenoid 36a decays at a relatively low rate. Just before the current falls to zero, and before the flange 42 of the pump plunger 32 has moved into engagement with its stop (i.e. the step in the pump housing bore), a drive current is re-applied to the winding again for a short time. Just after this current is removed, movement of the pump plunger 32 comes to a stop and, at this instant, a small glitch or discontinuity can be seen in the drive current waveform. The current waveform is monitored by the glitch detect circuit 54, which provides an output signal 62 to indicate when the discontinuity has occurred. The output signal 62 is provided to the timer circuit 56, where a time difference is measured between (i) the signal 62 to indicate that the pump plunger has stopped moving and (ii) the signal 60 to indicate that movement of the pump plunger was initiated.

A time difference signal 64 representing the difference between the timing of the signals 60, 62 is provided to the ECU 24 where the processor 26 compares it with a predetermined value for the time difference expected for a pump plunger 32 having completed a normal pumping stroke (referred to as a valid pumping stroke). During the pumping event, a pressure develops within the chamber 48, and ultimately within the supply pipe 22, due to movement of the pump plunger 32. This pressure is a reflection of the characteristic of the injection device 18. In normal operation, the time taken from the application of the drive current 58 to the actuator 36 to cause movement of the plunger 32, build-up of the pressure in the pump chamber 48, and delivery of the glitch detect signal 62 will be a finite time, for example of the order of one millisecond. If the computed time difference 64 is greater or less than the expected time difference, a decision must be made as to whether that pumping stroke should be counted as valid, or whether the pumping stroke should be discounted as invalid. For example, if the calculated time difference is not within a pre-determined tolerance of the expected time difference for a normal pumping stroke, the pumping event is deemed invalid.

By way of example, if the supply tank 28 were to become depleted or if reagent in the supply pipe 30 or pump chamber 48 were to change from liquid to gas phase, the pump 20 would not be able to generate the expected pressure in the pump chamber 48 with the result that the resistance to travel as seen by the plunger 32 and the actuator 36 would be less than for a normal pumping stroke. In this case, the time interval between the timer 56 receiving the signal 60 and the glitch detect signal 62 would be shorter than normal (i.e. shorter than for a normal pumping stroke). Conversely, if the temperature of the pump 20 and the reagent were below its freezing point or otherwise clogged with salt crystals, then the plunger 32 might not move at all, or only very slowly, despite a drive current 58 being supplied to the actuator. In this case the time interval between the timer 56 receiving the signal 60 and the glitch detect signal 62 would be longer than normal. In both of these examples, a comparison of the measured time difference signal 64 with a predetermined value for the time difference signal which represents a normal pumping event provides a means of determining whether or not the pumping event is valid and should be counted.

Other glitch detect methods may be employed to determine the end of the plunger stroke whilst using the same principle of monitoring the current drive waveform (for example, as described in the above-referenced patents). For example, a change in the slope of current decay or current flow through the solenoid may be used to identify the end of plunger movement. Also, instead of monitoring the end of the pumping stroke using a glitch detection technique, it is also possible to monitor the end of the plunger return stroke to determine whether a valid pumping event has occurred.

In order to calculate a total volumetric displacement of the pump apparatus since an initial condition (e.g. since the supply tank was at full level), the aforementioned method is carried out to count the number of pumping strokes, except that if the difference signal 64 output from the timer circuit 56 indicates an invalid pumping stroke, the totalized count is not incremented. By knowing the actual pump volume displacement of a single, valid pumping stroke, the total volume displacement of the pump since an initialized condition can then be determined by multiplying the actual pump volume displacement of a single, valid pumping stroke by the actual number of valid pumping strokes that have been counted.

The glitch detect circuit 54 is therefore used to eliminate from the total pumping stroke count any plunger stroke which is not valid i.e. which would not have caused a full volumetric displacement of reagent to the injection device 18. In this way, inaccuracies in the stroke of the plunger 32, for example due to problems at low temperatures, which would otherwise give rise to inaccuracies in the total flow calculation can be eliminated or substantially removed.

Figure 4:
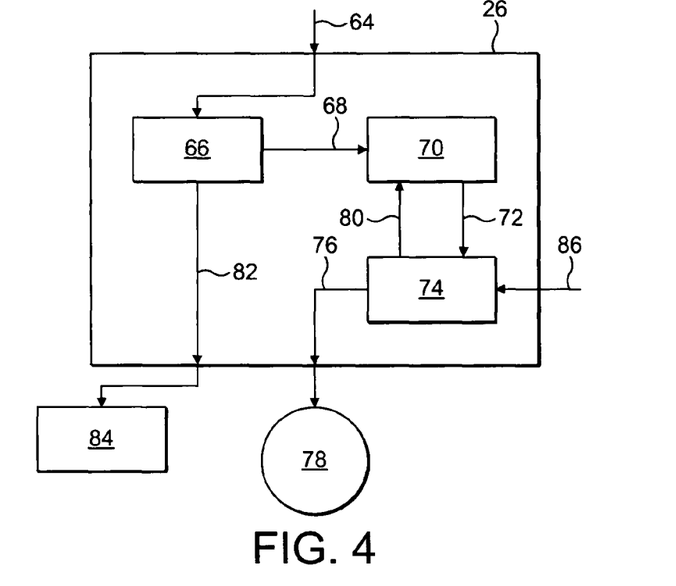
FIG. 4 is a schematic diagram of a processor of the engine control unit of the system in FIG. 3.

FIG. 4 shows the components of the processor 26 of the ECU 24 for determining the total volume displacement of the pump. The time difference signal 64 is input to the processor 26 where it is received by a comparator 66 which compares the time difference signal 64 with a pre-stored time difference expected for a normal pumping stroke. If the time difference signal 64 is within a predetermined tolerance of the pre-stored time difference, the comparator 66 outputs a valid count signal 68 to a counter unit 70. If the comparator 66 determines that the time difference signal is not within a predetermined tolerance of the pre-stored time difference, an invalid count signal 82 is output to an emissions on-board diagnostic module (OBD Module) 84, which records that an invalid pumping stroke has occurred. Knowledge of invalid pumping strokes may be provided to the OBD module 84 to aid in the identification of ineffective or malfunctioning operation of the reagent dosing system.

The counter unit 70 delivers a total count output signal 72 to a calculation unit 74 which calculates the total pump volume delivered since the initial condition (e.g. since the supply tank 28 was at full level). The calculation unit 74 also compares the total count with the known number of total pumping strokes required to deplete the supply tank 28 fully and provides an output signal 76 to a tank content indicator 78.

The tank content indicator 78 provides an indication of the remaining level of reagent within the supply tank 28. The remaining level of reagent within the supply tank 28 can therefore be determined by subtracting the calculated value for total pump delivery volume from the level of reagent at the initial condition.

It is not necessary for the calculation unit 74 to calculate the remaining tank contents after each valid pumping stroke (e.g. after each count is incremented by the counter unit 70), and instead a count request signal 80 is output from the calculation unit 74 to the counter unit 70 at a set frequency (e.g. every 5 minutes) to initiate the total count signal 72 being provided to the calculation unit 74.

The processor also includes a non-volatile memory (not shown) to which the current total count of valid pumping strokes is stored. It is important that the memory is non-volatile so that, for example, in the event of disconnection of the battery of the vehicle in which the system is used, the total count of valid pumping strokes is not lost.

In order to use the calculation of the number of valid plunger strokes to determine the remaining level of fluid in the supply tank 28, it is necessary to have an accurate indication of the level of fluid at the initial condition (e.g. when the supply tank was full). This may be achieved, for example, by using a replaceable canister for the supply tank 28, which is replaced each time there is an indication that the canister has depleted below a certain level. By using a replaceable canister, the initial volume of fluid within the canister is always known accurately at the start of delivery (i.e. the initial condition referred to above). The calculation unit 74 therefore also receives a re-fill input signal 86 which provides an indication to the comparator that the canister has been replaced and the total pump delivery since the initialising condition should be reset to zero.

If it is determined that the level of fluid within the supply tank 28 drops below a predetermined level, an alert signal 88 is provided by the ECU 24, as shown in FIG. 3, to provide an indication that action needs to be taken to re-fill or replace the supply tank 28.

Figure 5:
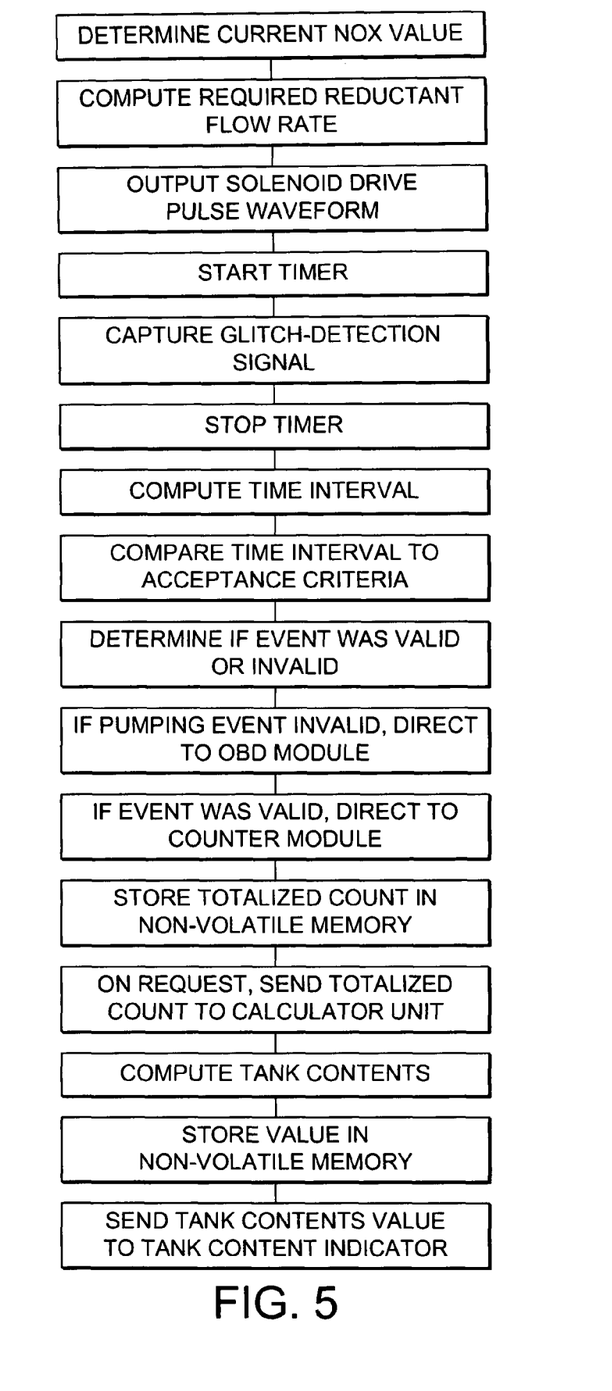
FIG. 5 is a flow diagram to illustrate a method of one embodiment of the invention for determining the supply tank level of a source of reagent in the fluid delivery system of FIG. 3.

FIG. 5 is a flow diagram to illustrate the aforementioned method steps for providing an indication of the level of the supply tank to the tank content indicator 78.

One potential difficulty with the aforementioned counting method is that the actual displacement of the metering pump 20 may be slightly less or more than the specified value due to manufacturing tolerances. Over the course of depleting the supply tank 28, any such discrepancy between the actual pump volume displacement and the specified pump volume displacement may therefore accumulate a significant error both in the total volumetric delivery and thus in the remaining tank content computation.

In order to overcome this potential difficulty, a modification to the aforementioned method may be used which includes running the metering pump 20 during manufacture through its range of operation and over a known number of strokes so that its actual volume displacement can be measured and compared to the theoretical volume displacement, and an adjustment or offset applied to the in-running calculation.

Although the present invention has particular benefits when employed in a reagent dosing system for an internal combustion engine, it will be appreciated that the invention is also applicable to other systems in which total fluid delivery is to be measured and/or the level of a fluid tank is to be monitored without the need for an additional fluid level sensor. For example, the invention also has application in a fuel injection system for delivering an accurate volume of fuel to an injection nozzle of the engine for combustion purposes. Further, the disclosed technique for keeping track of totalized fluid dispensed and computed fluid remaining on board may be used to establish mission duration for other applications such as remotely piloted or robotized vehicles.

The invention claimed is:

1. A fluid delivery system for delivering a metered dose of fluid from a supply tank (28) to a downstream chamber or vessel (10), the system comprising:
   a pump apparatus (20) comprising a pump plunger (32) which is operable to perform a pumping stroke under the control of an electromagnetic actuator (36), including a solenoid (36a), to effect delivery of the fluid,
   a control unit (24) for supplying an input signal (58) to the solenoid (36a) to initiate a current flow to the solenoid (36a) and thereby initiate movement of the pump plunger (32),
   an electronic device (54) which provides an output signal to indicate that movement of the pump plunger has stopped at the end of the pumping stroke,
   a timer for determining a time difference between the input signal (58) being supplied to the solenoid (36a) and the output signal being output by the electronic device (54), and
   a processor (26) for comparing the time difference with a predetermined time difference and determining, as a result of the comparison, whether or not the pump plunger (32) has performed a valid pumping stroke in which an intended volume of fluid is displaced.

2. The fluid delivery system as claimed in claim 1, for delivering a metered dose of reagent fluid to an exhaust passage (10) in an engine exhaust dosing system.

3. The fluid delivery system as claimed in claim 1, wherein the pump apparatus (20) further includes an armature (38) coupled to the pump plunger (32) which is attracted to the solenoid (36a) when a current is supplied thereto, thereby causing the pump plunger (32) to move.

4. The fluid delivery system as claimed in claim 1, wherein the processor (26) forms a part of the control unit (24).

5. The fluid delivery system as claimed in claim 1, wherein the processor (26) includes a counter for counting the number of valid pumping strokes so as to determine a total volumetric quantity of fluid delivered to the downstream vessel (10) since an initial condition.

6. The fluid delivery system as claimed in claim 1, wherein the processor is operable to determine a value for a remaining level of fluid within the supply tank based on (i) the total volumetric quantity of fluid delivered to the downstream vessel (10) since an initial condition and (ii) a fluid level in the supply tank (28) at the initial condition.

7. The fluid delivery system as claimed in claim 5, wherein the initial condition is when the supply tank (28) is at full level.

8. The fluid delivery system as claimed in claim 7, wherein the supply tank (28) is a replaceable canister having a known full level, the canister being replaceable each time the processor (26) determines that the supply tank has depleted below a predetermined amount.

9. The fluid delivery system as claimed in claim 1, wherein the electronic device is a glitch detect circuit (54) for determining when movement of the pump plunger (32) has stopped at the end of a pumping stroke.

10. The fluid delivery system as claimed in claim 9, wherein the glitch detect circuit (54) determines when movement of the pump plunger (32) has stopped at the end of the pumping stroke by monitoring a change in current decay through the solenoid (36a).

11. The fluid delivery system as claimed in claim 1, for use in a reagent dosing system of an internal combustion engine.

12. The fluid delivery system as claimed in claim 1, for use on board a remotely piloted or robotized vehicle.

13. A method for determining the total number of valid pumping strokes performed by a pump apparatus (20) of a fluid delivery system for delivering a metered dose of fluid from a supply tank to a downstream chamber or vessel, the method comprising:
    driving a pump plunger of the pump apparatus to perform a pumping stroke under the control of an electromagnetic actuator, including a solenoid, to effect delivery of the fluid,
    supplying an input signal to the solenoid to initiate a current flow to the solenoid and thereby to initiate movement of the pump plunger,
    counting the number of input signals so as to determine a total number of pumping strokes that are initiated,
    detecting when movement of the pump plunger has stopped and generating an output signal to indicate said stopping of pump plunger movement, and
    determining a time difference signal between the input signal being supplied to the solenoid and the output signal being generated,
    comparing the time difference signal with a predetermined time difference,
    determining, as a result of the comparison, whether or not the pump plunger has performed a valid pumping stroke,
    and, if it is determined that the pump plunger has not performed a valid pumping stroke, discounting the pumping stroke from the total number of pumping strokes so as to determine an actual number of valid pumping strokes which have contributed to depletion of fluid within the supply tank.

14. The method as claimed in claim 13, further comprising determining a value for the volume of fluid delivered by a single, valid pumping stroke, and
    using the actual number of valid pumping strokes and the value for the volume of fluid delivered by a single, valid pumping stroke to determine a remaining level of fluid within the supply tank.

15. The method as claimed in claim 13, further comprising determining a value for the volume of fluid delivered by a single, valid pumping stroke, and
    using the actual number of valid pumping strokes and the value for the volume of fluid delivered by a single, valid pumping stroke to determine the total volume of fluid delivered since an initial condition.

16. The method as claimed in claim 15, wherein the initial condition is equivalent to the supply tank being at a predetermined known full level.

17. The method as claimed in claim 15, wherein the step of determining the value for the volume of fluid delivered by a single, valid pumping stroke, includes interrogating a control unit of the fluid delivery system to look-up a pre-stored value of said volume.

18. The method as claimed in claim 13, wherein the step of providing an output signal when movement of the pump plunger has stopped at the end of the pumping stroke includes using a glitch detect circuit to determine when movement of the pump plunger has stopped.

19. The method as claimed in claim 18, including determining when movement of the pump plunger has stopped by monitoring a change in slope of current flow through the solenoid or a discontinuity in said current flow.

20. The method as claimed in claim 14, including providing an alert signal if it is determined that the remaining level of fluid within the supply tank drops below a predetermined level.

21. A reagent dosing system for an internal combustion engine including a fluid delivery system as claimed in claim 1 for delivering a metered dose of reagent from a reagent supply tank (28) to an exhaust passage (10).

* * * * *